May 14, 1963
C. KLEESATTEL
3,089,333
AMPLITUDE MEASURING DEVICES FOR
HIGH FREQUENCY VIBRATIONS
Filed Oct. 26, 1960
2 Sheets-Sheet 1
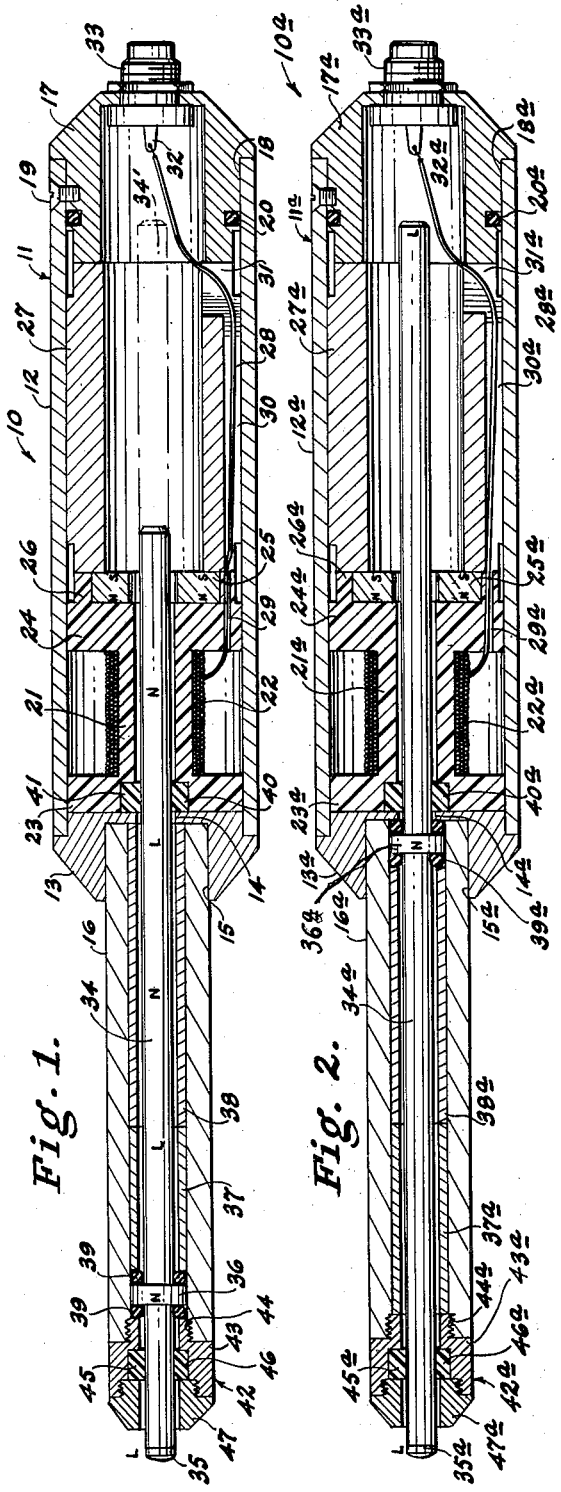
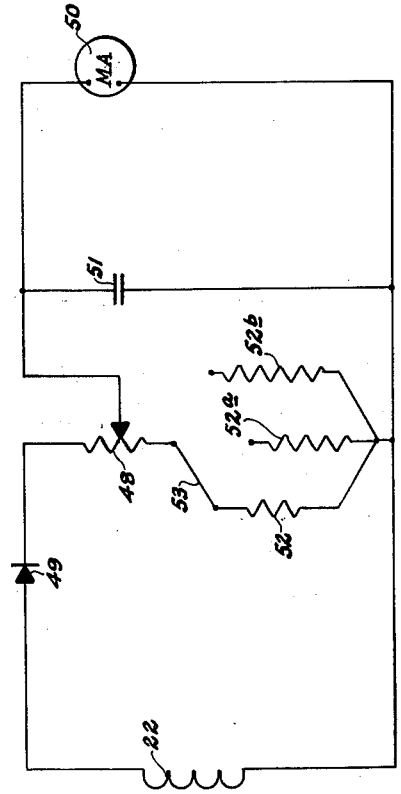
*Fig. 1.*  *Fig. 2.*  *Fig. 6.*
INVENTOR.
CLAUS KLEESATTEL
BY
ATTORNEY.

May 14, 1963
C. KLEESATTEL
AMPLITUDE MEASURING DEVICES FOR
HIGH FREQUENCY VIBRATIONS
3,089,333
Filed Oct. 26, 1960
2 Sheets-Sheet 2
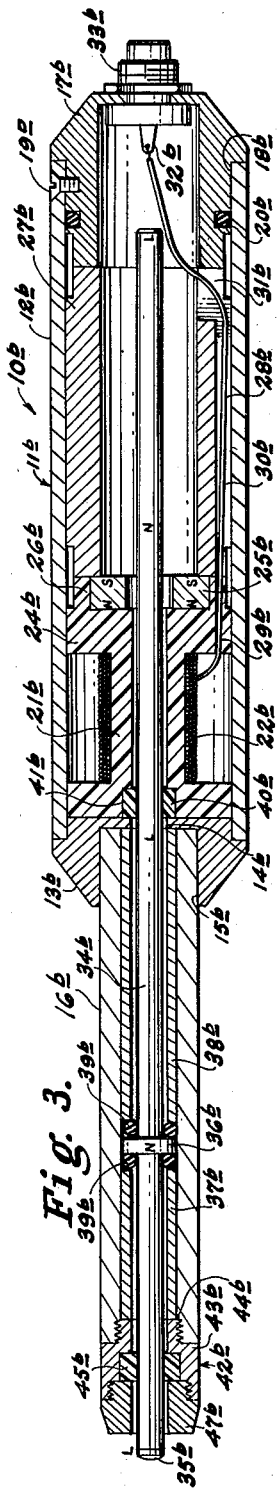
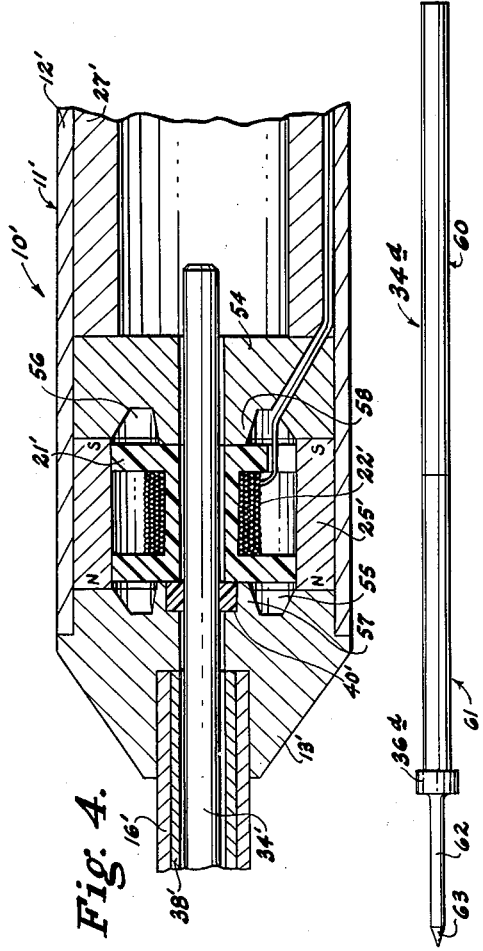
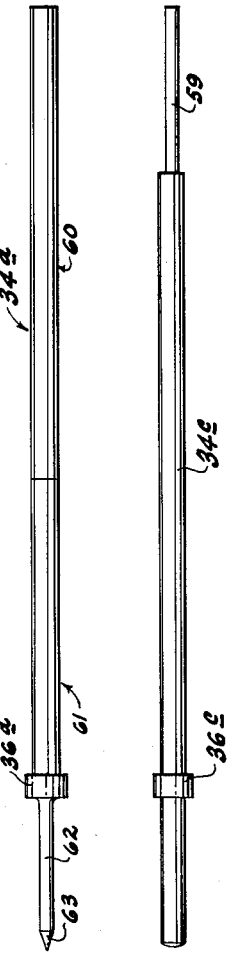
INVENTOR.
CLAUS KLEESATTEL
BY
ATTORNEY.

United States Patent Office 3,089,333
Patented May 14, 1963

3,089,333
AMPLITUDE MEASURING DEVICES FOR HIGH FREQUENCY VIBRATIONS
Claus Kleesattel, Forest Hills, N.Y., assignor to Cavitron Ultrasonics Inc., Long Island City, N.Y., a corporation of New York
Filed Oct. 26, 1960, Ser. No. 65,200
11 Claims. (Cl. 73—71.4)

This invention relates generally to devices for measuring the amplitude of ultrasonic or high frequency vibrations.

Ultrasonic or high frequency acoustic energy has been applied in many fields. For example, ultrasonic cleaning apparatus has been developed wherein the articles to be cleaned are immersed in a cleaning liquid within a tank having a flexible bottom or other wall to which a transducer is connected for the purpose of effecting the ultrasonic or high frequency vibration of such wall by which the ultrasonic vibrations are transmitted to the cleaning liquid to cause cavitation of the latter for enhancing the cleaning effect on the immersed articles. In the described cleaning apparatus, as well as in other devices employing ultrasonic or high frequency acoustic energy, the efficiency of the vibrations in performing the desired operation is largely dependent upon the maintenance of an optimum amplitude of the vibrations. Although an ultrasonic cleaning apparatus of the described character may be initially designed and constructed so as to provide the optimum amplitude of vibration at a particular frequency, various factors, such as, the ageing of the tubes of the generator used for energizing the transducer or variations in the loading of the vibrated member, may cause the actual amplitude of vibration to vary from the optimum designed value. Accordingly, there has been a need to provide a reliable and simple apparatus which can be used by relatively unskilled personnel for the purpose of measuring the actual amplitude of the vibrations during the operation of an apparatus employing ultrasonic or high frequency acoustic energy.

Accordingly, it is an object of this invention to provide devices for conveniently measuring the amplitude of ultrasonic or high frequency vibrations, and which do not require any connection to the vibrated member.

It is another object of the present invention to provide devices for measuring the amplitude of ultrasonic or high frequency vibrations without substantially loading the vibrated member, thereby avoiding any change in the amplitude of the vibrations by reason of the measurement thereof so as to ensure an accurate measurement of the amplitude during normal operation.

In accordance with an aspect of this invention, an amplitude measuring device includes a probe or sensing element having a polarized, elongated magnetostrictive rod which is tuned with respect to the frequency of the vibrations to be measured, for example, a rod having a length which is a whole multiple of the half-wavelength of the ultrasonic or high frequency standing wave generated in the rod at the frequency of the vibrations to be measured so that the natural frequency of the rod is substantial equal to the frequency of the vibrations to be measured and the latter can vibrate the rod merely by the relatively light contact of one end thereof with the vibrated member, and a pick-up coil supported in surrounding relation to the rod at a location along the latter spaced from a loop of longitudinal motion so that a voltage is induced in the coil as a result of the transmission of vibratory energy to the magnetostrictive rod.

Another object of the invention is to provide a device of the described character which is adpted to measure the amplitude of vibrations at several different frequencies.

Still another object of the invention is to provide a device for measuring the amplitude of ultrasonic or high frequency vibrations which is operated exclusively by the energy transmitted thereto from the vibrated member, thereby avoiding the necessity of providing a separate power supply for the measuring device.

In accordance with another aspect of the invention, the output of the pick-up coil of the probe or sensing element is fed directly to a meter circuit which feeds the rectified output of the pick-up coil to a microammeter connected across a condenser, such microammeter being calibrated to directly indicate the amplitude of the measured vibrations. Further, the meter circuit is simplified by providing the pick-up coil with a large number of turns to match the impedance of the meter circuit and thereby avoid the necessity of providing a transformer in the meter circuit.

In accordance with a further aspect of the invention, the probe or sensing element of the amplitude measuring device has interchangeable magnetostrictive rods which are respectively tuned to the several frequencies at which the amplitudes of vibrations are to be measured, and the probe or sensing element is designed and constructed so as to facilitate the interchanging of the magnetostrictive rods, with the selected magnetostrictive rod being, in each case, correctly disposed in relation to the pick-up coil so as to induce voltages in the latter which can be conveniently employed for operating the microammeter of the meter circuit without requiring amplification of the output from the pick-up coil.

Still another object of the invention is to provide an amplitude measuring device of the described character which has a liquid-tight probe or sensing element that can be safely immersed in a body of liquid for use in measuring the amplitude of the vibrations of a submerged member, for example, the flexible diaphragm or the like forming a part of a container for liquids, as in the previously mentioned ultrasonic cleaning apparatus.

The above, and other objects, features and advantages of the invention, will be apparent in the following detailed description of illustrative embodiments thereof which is to be read in connection with the accompanying drawings forming a part hereof, and wherein:

FIG. 1 is an axial sectional view of a probe or sensing element forming a part of a device embodying the invention for measuring the amplitude of vibrations at a frequency of 40 kc./sec.;

FIG. 2 is a view similar to that of FIG. 1, but showing the probe or sensing element with another magnetostrictive rod therein suited for measuring the amplitude of vibrations at a frequency of 10 kc./sec.;

FIG. 3 is another view similar to that of FIG. 1, but showing a magnetostrictive rod in the probe or sensing element so as to adapt the latter for measuring the amplitude of vibrations at a frequency of 20 kc./sec.;

FIG. 4 is a fragmentary sectional view similar to a portion of FIG. 1, but showing a modification of the probe or sensing element illustrated therein;

FIG. 5 is an elevational view of a magnetostrictive rod similar to that installed in the probe or sensing element of FIG. 1, but having an increased sensitivity;

FIG. 6 is a wiring diagram showing the meter circuit which is connected to the probe or sensing element to complete the amplitude measuring device embodying the present invention; and FIG. 7 is a view similar to that of FIG. 5, but showing still another magnetostrictive rod for use in accordance with this invention.

Referring to the drawings in detail, and initially to FIG. 1 thereof, it will be seen that a device for measuring the amplitude of ultrasonic or high frequency vibrations in accordance with the present invention includes a probe or sensing element which is generally identified by the reference numeral 10. Probe or sensing element 10 includes a housing 11 that is made up of a relatively thin walled tube 12 which is brazed, welded or otherwise suitably secured, at one end, on a connecting piece 13. Connecting piece 13 has a central axial bore 14 formed with an enlarged diameter counterbore 15 facing away from tube 12 and in which an end portion of a tubular extension 16 is suitably secured, as by brazing, welding or the like. Housing 11 is completed by an end cap 17 having a reduced diameter portion 18 which telescopes into the end portion of tube 12 remote from connecting piece 13. End cap 17 is releasably secured to tube 12, as by a screw 19. A sealing ring 20 of rubber or the like is disposed in a circumferential groove formed in the outer surface of reduced diameter portion 18 and engages the inner surface of tube 12 to prevent the leakage of liquid into the interior of housing 11 between end cap 17 and tube 12.

A coil form or spool 21 of nylon or other suitable insulating plastic has a pick-up coil 22 of enameled copper wire or the like wound thereon between end flanges 23 and 24. Coil form or spool 21 is inserted into tube 12 of housing 11 until flange 23 abuts axially against connecting piece 13, and flanges 23 and 24 closely engage the interior surface of tube 12 to center the spool and thereby align its axial bore with the bore 14. A ring magnet 25, preferably of the type formed of a ceramic with a ferrous powder therein, is disposed against flange 24 of coil form 21 and is concentrically located by an annular rim 26 projecting axially from flange 24. A tubular spacer 27 is disposed in tube 12 and abuts, at its opposite ends, against ring magnet 25 and the inner end of end cap 17 so as to prevent axial displacement of magnet 25 and coil form 21.

Wire leads 28 extend along the housing from coil 22 through aligned axial grooves 29 and 30 in the outer peripheral surfaces of flange 24 and spacer 27, and then inwardly through a radial slot 31 at the end of groove 30 adjacent end cap 17 at which the leads 28 are connected to terminals 32 which are part of a liquid-tight connector plug 33 suitably mounted on end cap 17.

Probe or sensing element 10 further includes interchangeable rods 34 (FIG. 1), 34a (FIG. 2) or 34b (FIG. 3) which are selectively intended for use in measuring the amplitudes of vibrations at different standardized frequencies, for example, at 40 kc./sec., 10 kc./sec. and 20 kc./sec., respectively. Each of the rods 34, 34a and 34b is formed of Permanickel, nickel, Permendur or any other metal which has a high tensile strength and is highly magnetostrictive in character. Further, each of the magnetostrictive rods has a length equal to a whole multiple of one-half the wavelength $\lambda$ of ultrasonic or high frequency vibrations transmitted along the rod at the frequency for which the rod in question is intended so that the fundamental natural frequency of the rod, or an harmonic thereof, corresponds to the frequency of the vibrations whose amplitude is to be measured. Further, the length of each magnetostrictive rod is selected, within the foregoing limitations as to wavelength, so that, when the magnetostrictive rod is inserted axially through tubular extension 16 and coil form 21, the portion of the rod within coil form 21 will be spaced longitudinally from a loop of motion of the rod and a minimum length of the magnetostrictive rod will project axially beyond coil form 21 and ring magnet 25 toward end cap 17 while the other end of the magnetostrictive rod projects axially from tubular extension 16 and is exposed for contact with the vibrated member (not shown).

In the illustrated embodiment of the invention, the magnetostrictive rod 34a (FIG. 2) intended for measuring the amplitude of vibrations at a frequency of 10 kc./sec. has a length equal to one-half the wavelength of such vibrations in the rod 34a. Since the wavelength $\lambda = C/f$, in which C is the velocity of sound in the rod and $f$ is the frequency of the vibrations, the rod 34b (FIG. 3) intended for use in measuring the amplitude of vibrations at a frequency of 20 kc./sec. may have the same length as the rod 34a, that is, a length equal to the wavelength, or two times the half-wavelength, of vibrations in rod 34b at a frequency of 20 kc./sec. Further, the magnetostrictive rod (FIG. 1) intended for use in measuring the amplitude of vibrations at a frequency of 40 kc./sec. may have a length equal to that of the rods 34a and 34b, as indicated in broken lines at 34' (FIG. 1), that is, a length equal to twice the wavelength, or four times the half-wavelength, of vibrations transmitted along the rod at 40 kc./sec. However, the rod intended for use at 40 kc./sec. preferably has a length equal to three times the half-wavelength at that frequency, as indicated at 34 in FIG. 1. Although the added length indicated in broken lines at 34' on FIG. 1 has the advantage of providing rods of uniform length for measurements at the three different frequencies, that is, at 10, 20 and 40 kc./sec., the added length 34' unnecessarily adds to the energy that must be introduced into the rod for the purpose of exciting the pick-up coil 22.

Furthermore, the rods are designed, as to their diameters, so as to avoid flexural resonance at the frequency for which the particular rod is intended.

Each of the interchangeable magnetostrictive rods preferably has a tip 35 at the end thereof which is intended to project from the free end of tubular extension 16 for contact with the vibrated member, and such tip is formed of a hard metal, such as, tungsten carbide or titanium carbide, and is brazed or welded to the body of the magnetostrictive rod. The tip 35 avoids excessive wear of the end of the rod by reason of its contact with the vibrated member.

The magnetostrictive rods 34, 34a and 34b are further provided with radial flanges 36, 36a and 36b, respectively, at locations along the respective rods corresponding to nodes of the longitudinal motion of the latter. Preferably, the node of longitudinal motion at which the flange 36, 36a or 36b is located is the one closest to the loop of longitudinal motion at the end of the rod having the tip 35, that is, the flange 36, 36a or 36b is spaced from the tip 35 by a distance equal to one-quarter of the wavelength of the vibrations at the frequency for which the related magnetostrictive rod is intended.

In order to longitudinally locate the selected magnetostrictive rod with respect to the housing 11 so that the tip 35 of the rod projects from tubular extension 16 while a portion of the rod spaced from a loop motion is disposed within the coil form 21, the probe or sensing element 10 further includes a first tubular spacer 37 and a second tubular spacer 38 which are disposed within tubular extension 16, and which have an internal diameter substantially larger than the diameter of each of the rods 34, 34a and 34b so as to provide a radial clearance therebetween. O-rings 39 of rubber or other resilient material engage snugly about the selected magnetostrictive rod at the opposite sides of the flange 36, 36a or 36b and are dimensioned to fit snugly within the bore of tubular extension 16. The selected magnetostrictive rod is centered within the housing 11 by means of a bushing 40 which is mounted in an annular recess 41 at the end of the bore of coil form 21 adjacent connecting piece 13, and which is formed of a suitable bearing material, for example, polytetrafluoroethylene which is available under the tradename Teflon.

A retaining assembly 42 is provided at the free end of tubular extension 16 and includes a centrally bored plug 43 having a knurled outer surface and formed with a reduced diameter extension 44 which is externally threaded and screwed into an internally threaded end portion of the bore of tubular extension 16. The plug 43 is further formed with a counterbore 45 receiving a bushing 46, which is also preferably formed of Teflon and slidably engages the magnetostrictive rod for centering the latter. The bearing bushing 46 is held in the counterbore 45 by a centrally bored retaining member 47 which is screwed into plug 43.

As is apparent in FIGS. 1, 2 and 3, the tubular extension 16 is only slightly longer than the combined axial length of the tubular spacers 37 and 38, the flange 36, 36a or 36b of the selected magnetostrictive rod, and the sealing O-rings 39, and plug 43 is screwed into the internally threaded end of extension 16 so as to effect slight axial compression of sealing O-rings 39. Further, tubular spacers 37 and 38 are axially dimensioned so as to permit the use thereof in axially locating the flanges 36, 36a and 36b of the magnetostrictive rods at different positions along extension 16. More specifically, it will be seen that the length of tubular spacer 38 is approximately equal to the difference between one-quarter wavelength at 10 kc./sec. and one-quarter wavelength at 20 kc./sec., while the length of the tubular spacer 37 is approximately equal to the difference between one-quarter wavelength at 20 kc./sec. and one-quarter wavelength at 40 kc./sec.

As shown in FIG. 1, when the amplitude of vibrations at 40 kc./sec. is to be measured, that is, when the magnetostrictive rod 34 is to be installed in housing 11 of probe 10, the tubular spacers 37 and 38 are initially installed within tubular extension 16, and the rod 34 is thereafter inserted axially to dispose its flange 36 and the O-rings 39 between spacer 37 and the extension 44 of plug 43. The thus located magnetostrictive rod 34 has its tip 35 projecting axially from the retaining assembly 42 at the free end of extension 16, while a nodal portion, indicated at N, is disposed within coil form 21. Since the overall length of rod 34 is a whole multiple, that is, three times, one-half wavelength of vibrations transmitted through rod 34 at the frequency of 40 kc./sec., it will be apparent that the rod 34 will have a natural frequency of 40 kc./sec. and be resonant at that frequency.

If it is desired to measure the amplitude of vibrations at a frequency of 20 kc./sec., the tubular spacer 38 is initially inserted in extension 16, whereupon the rod 34b is inserted axially with the O-rings 39 at the opposite sides of its flange 36b, and finally the spacer 37 is inserted and held axially in position by the retaining assembly 42, as shown in FIG. 3. Since the rod 34b has a length equal to a whole multiple, that is, two times, of one-half wavelength of vibrations transmitted along such rod at a frequency of 20 kc./sec., it is apparent that rod 34b will have a natural frequency of 20 kc./sec. and will be resonant at that frequency.

Finally, if it is desired to measure the amplitude of vibrations at a frequency of 10 kc./sec., the rod 34a is initially inserted with the O-rings 39 at the opposite sides of its flange 36a, and thereafter the tubular spacers 37 and 38 are inserted into extension 16, as shown in FIG. 2, and are held axially in position by retainer 42. Since the length of rod 34a is equal to one-half wavelength of vibrations transmitted therealong at the frequency of 10 kc./sec., rod 34a will have a natural frequency of 10 kc./sec. and will be resonant at that frequency.

It will be apparent that, whichever magnetostrictive rod is selected for insertion in housing 11, the selected rod will be polarized by the permanent magnet 25. By reason of the magnetostrictive effect of the material from which the rods 34, 34a and 34b are formed, the stressing of the selected magnetostrictive rod resulting from the transmission of vibratory energy therethrough will modulate the magnetic field of magnet 25 and thereby induce an alternating voltage in the surrounding pick-up coil 22. The magnitude of the voltage or electromotive force induced in pick-up coil 22 will be a function of the amplitude of the vibrations transmitted through the selected magnetostrictive rod.

As shown in FIG. 6, the pick-up coil 22 of the probe or sensing element 10 is connected to a meter circuit that consists of a variable resistance 48 having the opposite ends of its resistance coil or element connected, by way of a rectifier 49 to the pick-up coil 22, and a microammeter 50 and condenser 51 connected in parallel between the center or movable tap of variable resistance 48 and one end of the resistance coil of the latter. The variable resistance 48 acts as a gain control and thereby serves to calibrate the ammeter 50. In order to avoid the necessity of providing a transformer between the pick-up coil 22 and the meter circuit, the pick-up coil 22 is preferably formed with a large number of turns matching the impedance of the meter circuit.

As is apparent in FIGS. 1, 2 and 3, the position of a nodal point with respect to the pick-up coil 22, as well as the relationship between the length of the coil and the length of a half-wavelength, may be different for each of the magnetostrictive rods 34, 34a and 34b. Since the stressing of each rod is at a maximum at the nodal point or points thereof and the relationship between the output of pick-up coil 22 and the amplitude of the vibrations transmitted to the magnetostrictive rod varies in accordance with the magnitude of the stressing of the rod at the portion thereof within the pick-up coil, and since the output of the coil is also influenced by the relationship between the length of the coil and the length of a half-wavelength of the standing wave generated in the rod, it is apparent that the relationship between the output of coil 22 and the amplitude of the vibrations will be different for each of the magnetostrictive rods 34, 34a and 34b. In order to make it possible to employ a single meter circuit in connection with the probe or sensing element 10 during the use of the latter with any one of the magnetostrictive rods, the meter circuit is further preferably provided with means compensating for the different positions of the nodal points of the several magnetostrictive rods relative to the pick-up coil.

As shown in FIG. 6, such compensating means may simply be in the form of three resistances 52, 52a and 52b which are selectively connected in series with the variable resistance 48 by means of a three-way switch 53 during the use of the probe or sensing element 10 with the magnetostrictive rods 34, 34a and 34b, respectively. The resistances 52, 52a and 52b are suitably selected so that the microammeter 50 accurately and directly indicates the amplitude of the sensed vibration when using the magnetostrictive rod 34, 34a or 34b. Alternatively, the meter 50 may have a number of differently calibrated scales for use with the interchangeable rods 34, 34a and 34b, respectively. A still further compensating possibility exists in selecting the lengths of the spacers 37 and 38 so that for each of the magnetostrictive rods, a nodal point will be located with respect to the center of the pick-up coil so as to result in uniform output from the coil for all of the rods.

In the probe or sensing element 10 illustrated in FIGS. 1, 2 and 3, the entire housing 11 may be formed of non-magnetizable material, for example, aluminum or the like, in which case the lines of magnetic flux from magnet 25 which travel through the selected magnetostrictive rod 34, 34a or 34b do not have a closed return path. However, as shown in FIG. 4, a probe or sensing element 10' which is generally similar to the previously described probe 10 and has its corresponding parts identified by the same reference numerals, but with a prime appended thereto, may have its permanent magnet 25' in the form of a ring or sleeve extending around the nylon coil form or spool 21'. The magnet 25' and coil form 21' are interposed axially between the connecting piece 13' which is here formed of soft magnetizable steel, and a pole piece 54 also formed of soft magnetizable steel. In the illustrated probe 10', connecting piece 13' and pole piece 54 are formed with annular recesses 55 and 56, respectively, facing toward the coil form 21' therebetween and the magnet 25' has a greater axial length than the coil form 21'. Further, the connecting piece 13' and pole piece 54 have central hubs 57 and 58, respectively, which project axially beyond the remainder of the connecting piece and pole piece, respectively, so that the outer peripheral portions of connecting piece 13' and pole piece 54 intimately engage the end surfaces of ring or sleeve magnet 25' while the hubs 57 and 58 securely locate the coil form 21' therebetween. Magnet 25', coil form 21' and pole piece 54 are held in assembled relationship within housing 12' by means of a spacer 27' which corresponds to the spacer 27 of the first described embodiment of the invention.

In the probe or sensing element 10', it is apparent that the magnetizable connecting piece 13' and pole piece 54 and the magnetostrictive rod 34' cooperate to define closed paths for the magnetic lines of flux from the magnet 25'.

Each of the magnetostrictive rods 34, 34a and 34b intended for use with the probe or sensing element 10 or 10' for measuring the amplitude of vibrations at 40 kc./sec., 10 kc./sec. and 20 kc./sec., respectively, is, with the exception of the flange 36, 36a or 36b, of uniform diameter along its entire length so that the stresses are equal at each of the nodal points, or at least there is no magnification of the stress developed in the rod by reason of the configuration thereof. Although it is a feature of the devices embodying the present invention that the output signal from the pick-up coil 22 is of sufficient magnitude so that it can be used to directly operate the microammeter 50 without further amplification of the signal, it may be desirable, when measuring vibrations having extremely small amplitudes, to form the magnetostrictive rod of the probe or sensing element so as to achieve an amplification or increase of the amplitude during transmission of the vibrations along the magnetostrictive rod. Thus, as illustrated in FIG. 5, a magnetostrictive rod 34c intended for use in measuring the amplitude of vibrations at 40 kc./sec., that is, a rod that may be used in place of the rod 34, and that has a length equal to three times the half-wavelength of vibrations transmitted along rod 34c at a frequency of 40 kc./sec., may be formed with an end portion 59 having a diameter that is substantially smaller than the diameter of the remainder of the rod 34c, and that extends for a distance along the rod equal to approximately one-quarter wavelength. If the diameter of end portion 59 is one-half the diameter of the remainder of rod 34c, such magnetostrictive rod provides a magnification factor of four and a correspondingly higher sensitivity to the sensed vibration. Where the pick-up coil 22 or 22' is connected to a finite impedance, as in the meter circuit of FIG. 6, this increased or higher sensitivity would be reflected in an increase in the microamperes fed to microammeter 50 per micron of amplitude. If desired, the microammeter 50 can be conveniently provided with two suitably calibrated scales for directly indicating the actual sensed amplitude when using magnetostrictive rods of the type illustrated in FIGS. 1, 2 and 3, and when using magnetostrictive rods incorporating a predetermined magnification, as in FIG. 5, respectively.

If the amplitude of the vibrations to be measured is relatively large and therefore produces large stresses in the rod in which the standing wave is generated, there is the danger that such stresses may exceed the tolerance of the nickel or other magnetostrictive material forming the rod. In that case, a rod of the kind shown in FIG. 7, and there generally identified by the reference numeral 34d, may be conveniently employed.

The rod 34d is shaped to achieve a decrease in the amplitude during transmission of the vibrations therealong, and is formed in two parts 60 and 61 which are rigidly connected, as by brazing or welding. The part 60, which is intended to extend through the coil 22 or 22', is formed of a magnetostrictive material, for example, nickel, while the other part 61 is formed of a material, for example, Monel metal, which can tolerate high stresses. Further, the part 61 has an end portion 62 of reduced diameter provided with a tip 63 of hard or wear resistant metal, such as, tungsten carbide or titanium carbide, for contact with the vibrated member. The rod 34d is designed to be resonant at the frequency of the vibrations to be measured, and also has a flange 36d disposed at the location of a node of longitudinal motion.

When the tip 63 is held in contact with a vibrated member, the amplitude of the vibrations transmitted to tip 63 is reduced in passing from end portion 62 to the relatively large diameter remainder of part 61, so that the amplitudes in the magnetostrictive part 60, and hence the stresses in the latter, are within the range that can be safely tolerated by the magnetostrictive material, while the end portion 62 which is subjected to higher stresses is formed of a material suitable for that purpose.

Although several shapes of magnetostrictive rods have been described in detail herein with reference to the drawings, it is to be understood that other shapes may be employed for particular purposes. Further, the hard tip of the magnetostrictive rod may be pointed, as in the case of the tip 63, so that the pointed tip will dig slightly into the vibrated member and thereby avoid riding or drifting of the tip along the vibrated member.

Since the probes or sensing elements embodying the invention are provided with several interchangeable magnetostrictive rods each having a natural frequency corresponding to a particular frequency of vibrations of which the amplitude is to be measured, the rod is resonant at the particular frequency and the vibrations can be transmitted to the selected magnetostrictive rod from the vibrated member merely by the relatively light contact of the rod with the vibrated member or surface.

The force F holding the magnetostrictive rod against the vibrated member during measurement of the amplitude of the vibrations must be at least as large as the value calculated from the following formula so as to maintain contact between the vibrated area and the tip of the magnetostrictive rod:

$$F \geq \pi n Z V \sqrt{\left(\frac{1}{2Q}\right)^2 + \left(\frac{\Delta f}{f_0}\right)^2}$$

wherein:

(1) $Z = \phi c S$ = mechanical impedance of a rod of infinite length $\phi$ being the density of the magnetostrictive rod,
$c$ being the velocity of sound in the rod, and
$S$ being the cross-sectional area of the rod;

(2) V is the "velocity-amplitude" which is equal to $2\pi f_0 A$

A being the amplitude of the vibrations, and
$f_0$ being the natural or nominal frequency of the rod;

(3) $\Delta f$ is the difference between the actual frequency of the vibrations and the nominal or natural frequency of the rod; and (4) $n$ is the length of the rod expressed in terms of the number of half-wavelengths of vibrations transmitted in the rod at the nominal frequency $f_0$.

(5) $$Q = \frac{\pi}{\beta \lambda}$$

$\beta$ is absorption coefficient of the material
$\lambda$ is the wavelength of the vibrations.

It is apparent from the above that, if the actual frequency of the vibrations is equal to the nominal or natural frequency of the magnetostrictive rod, that is, $\Delta f = 0$, then F is reduced to a very small value to cover only internal friction or losses in the rod. However, even when there is as much as a 5% deviation between the actual frequency and the nominal or natural frequency of the rod, that is, even when $$\frac{\Delta f}{f_0} = \pm .05$$

the force F still remains within reasonable limits. Thus, as an illustrative example, it has been found that a nickel rod having a length of one wavelength at 20 kc./sec. and a diameter of 4 mm. requires a force F of only 2 kilograms for pressing the rod against the vibrated member when the latter is vibrated with an amplitude of 1 micron at a frequency which departs from the nominal frequency of 20 kc./sec. by as much as 5%. Under the same circumstances, but with $$\frac{\Delta f}{f_0} = 0$$

the required contact force F amounts only to 80 grams.

Since the contact force for urging the magnetostrictive rod against the vibrated member or surface need only have a relatively small value which does not substantially alter the loading of the vibrated member or surface so that the operating conditions of the latter are not changed during measurement of the amplitude of vibrations. Thus, the measured amplitude of vibration accurately corresponds to the amplitude under normal operating conditions of the apparatus.

It will also be noted that the housing 11 defines a continuous bore opening at the free end of extension 16 and having an enlarged diameter portion within extension 16 between the inner end of counterbore 15 and the extension 44 of plug 43 to receive the axial locating flange of the selected rod, the sealing rings 39 and the spacers 37 and 38, so that the magnetostrictive rods intended for use at different frequencies can be conveniently inserted axially into the bore of the housing and interchanged merely by removal of the retainer 42 and by suitable relocation of the spacers 37 and 38, as previously described in detail.

Although the illustrated embodiments of the invention show only two spacers 37 and 38 for axially locating the interchangeable rods, it will be apparent that a larger number of differently sized spacers can be provided to permit the interchanging of a larger number of magnetostrictive rods which are resonant at a correspondingly larger number of frequencies.

When a selected one of the interchangeable magnetostrictive rods is installed in the housing 11 of probe 10, the sealing O-rings 39 which are axially compressed by the action of retainer 42, and thus radially expanded into sealing contact with the inner surface of extension 16 and with the surface of the installed magnetostrictive rod prevent the leakage of liquid between the rod and extension 16 into the interior of the housing. The opposite end of housing 11 is effectively sealed by the sealing ring 20. Thus, the probe or sensing element embodying the present invention can be safely submerged in a liquid, for example, when it is desired to measure the amplitude of the vibration of the flexible bottom or diaphragm in an ultrasonic cleaning apparatus.

Since the magnetostrictive rod which is employed, at any time, has a natural frequency substantially corresponding to the frequency of the vibrations which are to be measured and thus is resonant, there is achieved a relatively large output from the pick-up coil 22, which output does not require further amplification for operating of an indicating meter or the like.

Although illustrative embodiments of this invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. A device for sensing the amplitude of vibration of a member which is vibrated substantially at a selected one of a plurality of predetermined high frequencies; said device comprising a housing having a pick-up coil and a coaxial annular permanent magnet therein which cooperate with the housing to define a bore opening at one end of the latter, a magnetostrictive rod selected from a plurality of interchangeable magnetostrictive rods corresponding to the plurality of predetermined high frequencies at which the amplitudes of vibrations are to be sensed and being inserted in said bore, said selected rod having a length equal to a whole multiple of a half-wavelength of vibrations transmitted through the rod at the corresponding high frequency so that said selected rod is resonant at said corresponding high frequency and can be made to vibrate by mere contact, at one end, with the member vibrated at said corresponding frequency, mounting means on said rod at the location of a node of longitudinal motion thereof, and means in said housing engageable with said mounting means of the selected rod with respect to the housing so that said one end of the selected rod projects through said open end of the housing and said magnet and coil are in surrounding relation to the selected rod with at least said coil being spaced along said selected rod from a loop of longitudinal motion in the vibrated rod, whereby said magnet polarizes the selected rod and the transmission of vibrations through the latter induces an alternating voltage in said coil which is a function of the amplitude of such vibration, said rod further having a reduced diameter portion which extends through said pick-up coil thereby to increase the sensitivity of said device to the amplitude of the vibrations of the contacted member.

2. A device for sensing the amplitude of vibration of a member which is vibrated substantially at a selected one of a plurality of predetermined high frequencies; said device comprising a housing having a pick-up coil and a coaxial annular permanent magnet therein which cooperate with the housing to define a bore opening at one end of the latter, a magnetostrictive rod selected from a plurality of interchangeable magnestostrictive rods corresponding to the plurality of predetermined high frequencies at which the amplitudes of vibrations are to be sensed and being inserted in said bore, said selected rod having a length equal to a whole multiple of a half-wavelength of vibrations transmitted through the rod at the corresponding high frequency so that said selected rod is resonant at said corresponding high frequency and can be made to vibrate by mere contact, at one end, with the member vibrated at said corresponding frequency, mounting means on said rod at the location of a node of longitudinal motion thereof, and means in said housing engageable with said mounting means of the selected rod inserted in said bore and axially locating said selected rod with respect to the housing so that said one end of the selected rod projects through said open end of the housing and said magnet and coil are in surrounding relation to the selected rod with at least said coil being spaced along said selected rod from a loop of longitudinal motion in the vibrated rod, whereby said magnet polarizes the selected rod and the transmission of vibrations through the latter induces an alternating voltage in said coil which is a function of the amplitude of such vibrations, said rod including two rigidly joined parts formed of high strength and magnetostrictive materials, respectively, said high strength and magnetostrictive parts being axially dimensioned to project through said open end of the housing and to extend through said coil and magnet, respectively, and said high strength part having a reduced diameter end portion for contact with the vibrated member so that the amplitude of vibration is reduced in said magnestostrictive part for avoiding excessive stressing of the latter when measuring large amplitudes.

3. A device for sensing the amplitude of vibration of a member which is vibrated substantially at a selected one of a plurality of predetermined high frequencies; said device comprising a housing containing a centrally bored coil form carrying a pick-up coil and a coaxial annular permanent magnet, said housing having a tubular extension defining a continuation of the central bore of said coil form and being open at its free end, a magnetostrictive rod selected from a plurality of interchangeable magnetostrictive rods corresponding to the plurality of predetermined high frequencies at which amplitudes of vibration are to be sensed and being inserted in said bore through said tubular extension, said selected rod having a length which exceeds the length of said bore and of said continuation and which is the smallest possible whole multiple of a half-wavelength of vibrations transmitted through the rod at the corresponding predetermined high frequency so that said selected rod is resonant at said corresponding predetermined high frequency and can be vibrated by mere contact, at one end, with a member vibrated at said corresponding high frequency, said rod further having a flange thereon dimensioned to fit into said tubular extension of the housing and being located along the related rod at a distance from said one end of the latter which is equal to a quarter-wavelength at said corresponding frequency, spacing means axially inserted in said tubular extension to locate said flange of the selected rod at a position along said extension where said one end of the selected rod projects from the extension while the rod extends through said bore of the coil form and said permanent magnet, whereby the selected rod is polarized and vibration of said selected rod induces an alternating voltage in said coil having a magnitude which is a function of the amplitude of the vibration, and retaining means engageable with said free end of the tubular extension to maintain said flange of the selected rod at said position.

4. A device as in claim 3; wherein said spacing means includes tubular spacers fitting in said tubular extension around the selected rod and having lengths equal to the differences between the quarter-wavelengths of said plurality of interchangeable rods.

5. A device as in claim 4; wherein said retaining means includes a centrally apertured plug screwed into said free end of the tubular extension to prevent axial removal of said spacers and said flange of the selected rod from said extension.

6. A device as in claim 5; further comprising resilient means extending around said selected rod at the opposite sides of said flange of the latter and being axially compressed by screwing in of said plug so that said resilient means is urged into sealing contact with said selected rod and said extension to prevent entry of liquid through the latter into said housing.

7. A device as in claim 3; wherein said annular magnet surrounds said coil form, and said housing includes a connecting piece of magnetizable metal at one end of said magnet; and further comprising a pole-piece of magnetizable metal at the other end of said magnet to provide a closed path for the magnetic flux from said magnet.

8. A device as in claim 3; wherein said coil form has an axially directed, annular rim extending from one end thereof, and said annular magnet is supported within said rim.

9. A device as in claim 3; further comprising bearing bushings located adjacent said free end of the tubular extension and adjacent said coil form and slidably receiving said selected rod to center the latter with respect to said bore and said continuation of the latter.

10. A device for measuring the amplitude of vibration of a member which is vibrated substantially at a selected one of a plurality of predetermined high frequencies; said device comprising a housing having a pick-up coil and a coaxial annular permanent magnet therein which cooperate with the housing to define a bore opening at one end of the housing, a magnetostrictive rod selected from a plurality of interchangeable magnetostrictive rods each being resonant at a corresponding one of said predetermined high frequencies so that a selected rod which is resonant at the selected high frequency with which the member is vibrated will be similarly vibrated by relatively light contact, at one end, with the vibrated member, said selected rod being inserted in said bore, means axially locating the selected magnetostrictive rod with respect to said housing so that said one end of the rod projects from the housing and said magnet and coil are in surrounding relation to the selected rod to polarize the latter and to have an alternating voltage induced in the coil which is a function of the amplitude of vibration of the contacted member, at least said selected rod having a reduced diameter portion which extends through said pick-up coil when the rod is inserted in said bore to provide a magnification factor increasing the relation between the output of said pick-up coil and the amplitude of the measured vibrations, a microammeter calibrated to indicated amplitude of vibration, and a meter circuit connecting said ammeter to said pick-up coil and having current rectifying means therein, said pick-up coil having a large number of turns matching the impedance of said ammeter and circuit.

11. A device for measuring the amplitude of vibration of a member which is vibrated substantially at a selected one of a plurality of predetermined high frequencies; said device comprising a housing having a pick-up coil and a coaxial annular permanent magnet therein which cooperate with the housing to define a bore opening at one end of the housing, a magnetostrictive rod selected from a plurality of interchangeable magnetostrictive rods each being resonant at a corresponding one of said predetermined high frequencies so that a selected rod which is resonant at the selected high frequency with which the member is vibrated will be similarly vibrated by relatively light contact, at one end, with the vibrated member, said selected rod being inserted in said bore, means axially locating the selected magnetostrictive rod with respect to said housing so that said one end of the rod projects from the housing and said magnet and coil are in surrounding relation to the selected rod to polarize the latter and to have an alternating voltage induced in the coil which is a function of the amplitude of vibration of the contacted member, at least said selected rod including two rigidly joined parts formed of high strength and magnetostrictive materials, respectively, said high strength and magnetostrictive parts being axially dimensioned to project through said open end of the housing and to extend through said coil and magnet, respectively, said high strength part having a reduced diameter end portion for contact with the vibrated member so that the amplitude of vibration is reduced in said magnetostrictive part for avoiding excessive stressing of the latter when measuring large amplitudes, a microammeter calibrated to indicated amplitude of vibration, and a meter circuit connecting said ammeter to said pick-up coil and having current rectifying means therein, said pick-up coil having a large number of turns matching the impedance of said ammeter and circuit.

References Cited in the file of this patent

UNITED STATES PATENTS

| | | |
|---|---|---|
| 2,002,372 | Greentree et al. | May 21, 1935 |
| 2,361,396 | Gross | Oct. 31, 1944 |
| 2,651,148 | Carwile | Sept. 8, 1953 |
| 2,830,165 | Carlin | Apr. 8, 1958 |
| 2,978,670 | Peek | Apr. 4, 1961 |